(12) United States Patent
Al Sheikh

(10) Patent No.: US 12,405,797 B2
(45) Date of Patent: Sep. 2, 2025

(54) BRANCH PREDICTION CIRCUITRY

(71) Applicant: Arm Limited, Cambridge (GB)

(72) Inventor: Rami Mohammad Al Sheikh, Morrisville, NC (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/346,407

(22) Filed: Jul. 3, 2023

(65) Prior Publication Data

US 2025/0013470 A1    Jan. 9, 2025

(51) Int. Cl.
*G06F 9/22* (2006.01)
*G06F 9/38* (2018.01)

(52) U.S. Cl.
CPC .......... *G06F 9/3806* (2013.01); *G06F 9/3814* (2013.01)

(58) Field of Classification Search
CPC .............................. G06F 9/3806; G06F 9/3814
See application file for complete search history.

(56) References Cited

U.S. PATENT DOCUMENTS

| 9,170,817 | B2 * | 10/2015 | Wang | G06F 9/3844 |
| 11,704,131 | B2 * | 7/2023 | Chen | G06F 11/3466 |
| | | | | 712/205 |
| 2020/0065106 | A1 * | 2/2020 | Kalamatianos | G06F 11/34 |
| 2020/0081717 | A1 * | 3/2020 | Orion | G06F 9/3848 |
| 2024/0192957 | A1 * | 6/2024 | Arunachalam | G06F 9/3806 |

FOREIGN PATENT DOCUMENTS

| GB | 2577051 B | 3/2021 | | |
| WO | WO-2018142140 A1 * | 8/2018 | ......... | G06F 9/30058 |
| WO | WO-2021108007 A1 * | 6/2021 | ......... | G06F 9/3808 |

\* cited by examiner

*Primary Examiner* — Cheng Yuan Tseng
(74) *Attorney, Agent, or Firm* — NIXON & VANDERHYE P.C.

(57) ABSTRACT

Branch prediction circuitry comprising branch target prediction circuitry to, for an identified block of sequential instructions, generate a branch target prediction identifying a predicted branch target for a selected branch instruction in the block of sequential instructions; output circuitry to output the branch target prediction; and determination circuitry to determine whether at least one condition is met. The branch target prediction circuitry is responsive to the determination circuitry determining that the at least one condition is met to generate the branch target prediction to identify both the predicted branch target for the selected branch instruction and one or more further predicted branch targets for one or more further branch instructions in the block of sequential instructions.

19 Claims, 12 Drawing Sheets

BRANCH PREDICTION CIRCUITRY

BACKGROUND

The present technique relates to the field of data processing.

A given block of instructions to be executed by processing circuitry in a data processing system may contain one or more branch instructions which, if taken, cause execution to branch to an identified branch target instruction. This branch target instruction could be within the same block of instructions, or it could be outside of the block of instructions.

Some data processing systems comprise branch prediction circuitry to make predictions relating to branch instructions in a block of instructions. For example, branch prediction circuitry may predict whether a given branch is expected to be taken and/or the branch target for the given branch. Branch prediction mechanisms can help to improve performance by, for example, providing information to dictate which instructions are fetched for execution.

SUMMARY

Viewed from one example, the present technique provides branch prediction circuitry comprising:
  branch target prediction circuitry to, for an identified block of sequential instructions, generate a branch target prediction identifying a predicted branch target for a selected branch instruction in the block of sequential instructions;
  output circuitry to output the branch target prediction; and
  determination circuitry to determine whether at least one condition is met,
  wherein the branch target prediction circuitry is responsive to the determination circuitry determining that the at least one condition is met to generate the branch target prediction to identify both the predicted branch target for the selected branch instruction and one or more further predicted branch targets for one or more further branch instructions in the block of sequential instructions.

Viewed from another example, the present technique provides a method comprising:
  generating a branch target prediction identifying a predicted branch target for a selected branch instruction in the block of sequential instructions;
  determining whether at least one condition is met;
  in response to determining that the at least one condition is met, generating the branch target prediction to identify both the predicted branch target for the selected branch instruction and one or more further predicted branch targets for one or more further branch instructions in the block of sequential instructions; and
  outputting the branch target prediction.

Viewed from another example, the present technique provides a system comprising:
  the branch prediction circuitry described above, implemented in at least one packaged chip;
  at least one system component; and
  a board,
  wherein the at least one packaged chip and the at least one system component are assembled on the board.

Viewed from another example there is provided a chip-containing product comprising the system of clause described above assembled on a further board with at least one other product component.

Viewed from another example, the present technique provides a computer program comprising computer-readable code for fabrication of the branch prediction circuitry described above.

Viewed from another example, the present technique provides a computer-readable medium to store the above computer program. The computer-readable medium can be transitory or non-transitory.

Further aspects, features and advantages of the present technique will be apparent from the following description of examples, which is to be read in conjunction with the accompanying drawings.

DESCRIPTION OF EXAMPLES

Figure 1:
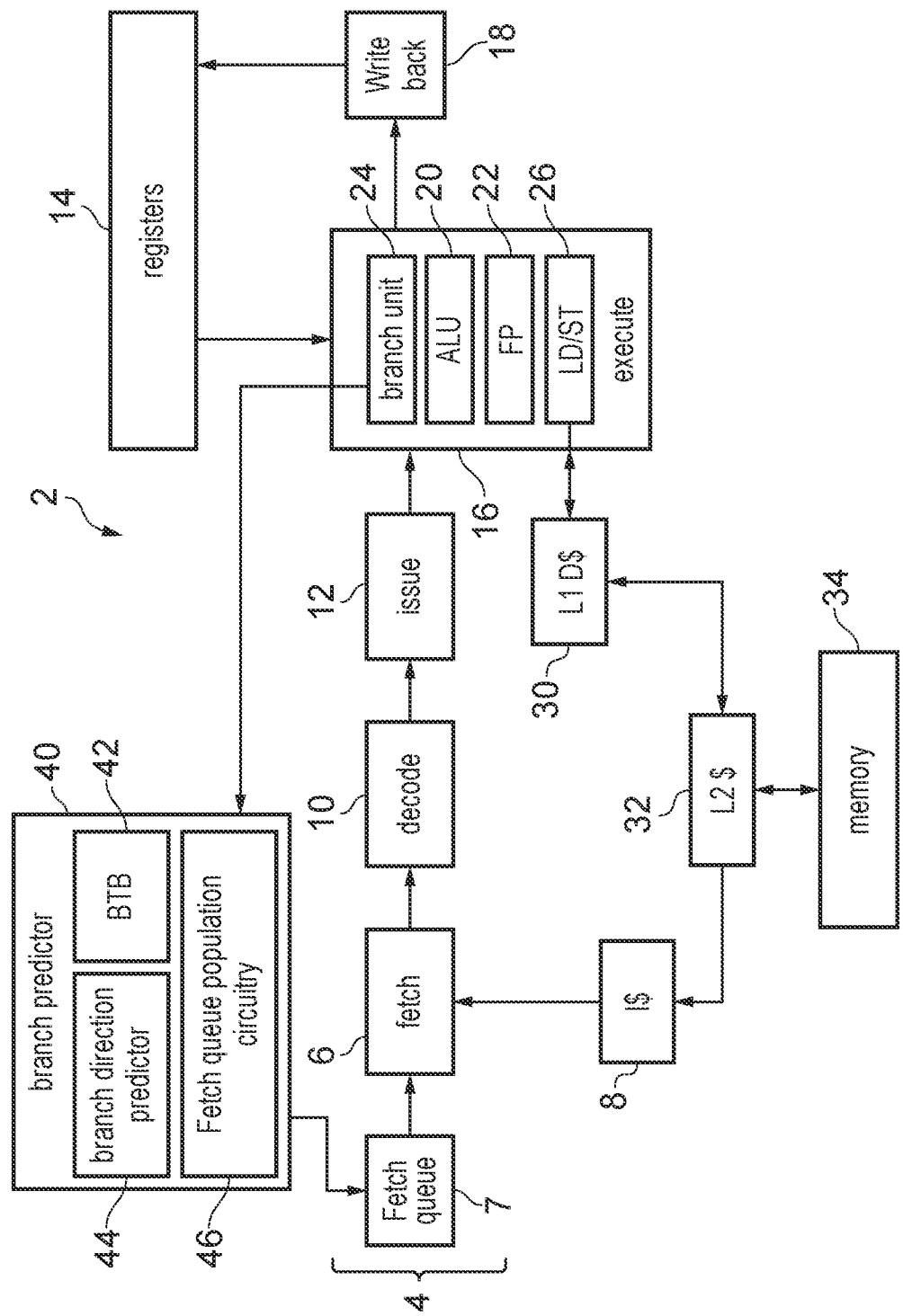
FIG. 1 illustrates an example of a data processing apparatus.

Before discussing example implementations with reference to the accompanying figures, the following description of example implementations and associated advantages is provided.

For a given block of sequential instructions (e.g. a block of multiple instructions in program order, the program order being the order in which the instructions would be executed if no branches were taken), branch prediction circuitry may be arranged to output a branch prediction for a selected branch instruction in the block. If the given block of multiple instructions includes multiple branch instructions, any predictions made for other branch instructions in the bock may then be discarded. For example, the branch prediction circuitry may generate a prediction for the first predicted-taken branch in the block, and then discard any predictions made for subsequent branch instructions in the block, on the assumption that these instructions will be skipped over by the taken branch.

One might imagine that, when there are multiple branch instructions in a block of instructions, the branch prediction circuitry would step through the branch instructions one at a time until one is identified to be taken. However, in reality, it is more likely that the branch prediction circuitry would generate predictions for all of the branch instructions in the block at the same time, with any predictions for branch instructions after the first predicted-taken branch being discarded. One reason for this is that it can be much quicker to search branch prediction structures based on the whole block of instructions at once, than to individually look up each instruction.

This system works well and is fairly efficient when the branch instruction for which the prediction was generated has a branch target which falls outside the block of instructions. In such situations, any branch predictions generated for subsequent branch instructions in the block are irrelevant, since control flow is expected to skip over all of these instructions. However, not all branch instructions represent branches to instructions outside of the block of instructions—sometimes, a branch target may be within the same block of instructions (e.g. it may be a short-distance branch). In fact, the inventors of the present technique realised that this can happen fairly regularly, particularly when the block of sequential instructions is large.

Hence, examples of the present technique aim to limit the frequency with which useful branch predictions are discarded, thus improving the efficiency of branch prediction mechanisms.

In particular, examples of the present techniques provide branch prediction circuitry comprising branch target prediction circuitry to, for an identified block of sequential instructions, generate a branch target prediction identifying a predicted branch target for a selected branch instruction in the block of sequential instructions. The branch prediction circuitry also comprises output circuitry to output the branch target prediction, and determination circuitry to determine whether at least one condition is met. The branch target prediction circuitry is responsive to the determination circuitry determining that the at least one condition is met to generate the branch target prediction to identify both the predicted branch target for the selected branch instruction and one or more further predicted branch targets for one or more further branch instructions in the block of sequential instructions.

The identified block of instructions could be identified in any of a number of ways—for example, by a start address representing the first instruction in the block, with the last instruction in the block either being implicit (e.g. the block may have a predetermined size), or it could be explicitly represented by another address, by a size value indicating the size of the block of instructions, or by an offset indicating the start of the last instruction relative to the start address. The block of sequential instructions are sequential in the sense that they are consecutive in program order (e.g. an in-order processor would execute them one after the other in the program order, if no branches were taken). The at least one condition could include any of a number of possible conditions, some of which are discussed in the examples below. However, whichever condition is applied, the branch prediction circuitry of the present technique is provided with the capability to predict branch targets for multiple branch instructions in a single block of sequential instructions. This is advantageous because it can reduce the number of branch predictions that are discarded for a given block of sequential instructions.

Note that this differs from systems where, for example, two branches can be represented in a single entry of a branch prediction structure, thus allowing two branches to effectively be predicted at once. Such systems—which could be termed "two-taken" systems—rely on the assumptions that the first branch is almost always taken, and that the second branch will always follow the target of the first branch, whereas this is not required for the present technique. Moreover, the present technique is not affected by branch encoding (e.g. as opposed to the two-taken approach, which typically requires a particular encoding of the branch prediction data to represent two branches). The present technique is also not affected by branch bias (e.g. the assumption that certain branches are mostly-taken or mostly-not-taken), because the prediction for a given pair of instructions need not necessarily be static. Moreover, the present technique need not necessarily be limited to predicting the outcomes of up to two taken branches.

In some examples, the branch prediction circuitry comprises branch decision prediction circuitry to determine whether one or more branches represented by branch instructions in the block of sequential instructions are predicted-taken, and selection circuitry to select, as the selected branch instruction, a first predicted-taken branch instruction in the block of sequential instructions.

In this example, the selected branch instruction (for which a branch target is predicted) is the first branch instruction in the block of sequential instruction which the branch decision prediction circuitry predicts will be taken. This means that there may be additional branch instructions preceding the selected branch instruction in the block of sequential instructions, but these additional branch instructions have been predicted to be not-taken. In this example, when the at least one condition is met, the branch target prediction circuitry predicts a branch target for at least one further instruction, other than the selected branch instruction. For example, this could be a subsequent branch instruction in the block of sequential instructions (e.g. subsequent to the selected instruction). Accordingly, examples of the present technique make it possible to generate branch predictions beyond the first predicted-taken branch instruction in the block of sequential instructions.

In some examples, the determination circuitry is configured to determine that the at least one condition is met when the predicted branch target for the selected branch instruction is within the block of sequential instructions and there is at least one further branch instruction in the block of sequential instructions after the predicted branch target for the selected branch instruction.

Hence, in this example, a branch target prediction for the one or more further instructions is output when it is determined that there is at least one other branch instruction in the block of sequential instructions that succeeds the predicted branch target of the selected branch instruction. Thus, the branch prediction circuitry of this example takes account of the fact that some branches may be relatively short, and thus may branch to code within the same block of sequential instructions. Hence, the branch prediction circuitry of this example reduces the likelihood of useful branch predictions being discarded.

In some examples, the determination circuitry comprises comparison circuitry to compare address information associated with the predicted branch target with address information associated with a last instruction in the block of sequential instructions, and the determination circuitry is configured to determine, in dependence on the comparison, whether the predicted branch target for the selected branch instruction is within the block of sequential instructions.

This is an example of how the determination may determine whether the predicted branch target for the selected instruction is within the block of sequential instructions. The address information in this example could be any information from which an address can be derived; for example, the address information could be a full address or an offset relative to a base address, which could be an address of the first instruction in the block of sequential instructions. Moreover, the address information associated with the last instruction in the block of sequential instructions could be indicative of the start of the last instruction or the end of the last instruction, for example.

In some examples, the branch prediction circuitry comprises fetch queue population circuitry to populate a fetch queue in dependence on the prediction, the fetch queue indicating instructions to be fetched for execution by processing circuitry.

Hence, in this example, the fetch queue is populated in dependence on the prediction generated by the branch target prediction circuitry. This allows the fetch queue to be more accurately populated, taking into account whether some of the instructions in the block of sequential instructions are expected to be skipped over due to a branch being taken.

In some examples, the fetch queue population circuitry is responsive to the determination that the at least one condition is met to generate a compressed fetch-queue entry indicating at least two discontiguous instructions from the sequence of instructions, and populate the fetch queue with the compressed fetch-queue entry.

In this example, by populating a single fetch queue entry with information indicating at least two discontiguous instructions from the block of sequential instructions, a larger number of instructions can be represented in the fetch queue. This is made possible by the fact that the branch target prediction circuitry is capable of generating a prediction indicating branch targets for two or more instructions in the block of sequential instructions.

In some examples, the fetch queue population circuitry is responsive to the determination that the at least one condition is met to generate the compressed fetch-queue entry to indicate the predicted branch target for the selected branch instruction and at least one of the one or more further predicted branch targets for the one or more further branch instructions in the block of sequential instructions.

Hence, the compressed fetch queue can indicate both the predicted branch target for the selected branch instruction and the further predicted branch target for each further branch instruction.

In some examples, the branch target prediction circuitry is configured to support generation of the branch target prediction to include predicted branch targets for the selected branch instruction and two or more further branch instructions in the sequence of instructions.

Hence, the branch prediction circuitry of this example of the present technique is capable of outputting a prediction indicating predicted branch targets for three or more branch instructions in the same block of sequential instructions. This demonstrates an advantage of the present technique over a two-taken approach—with the present technique, it is possible to predict the outcomes of three or more branch instructions in a single block of instructions.

In some examples, the determination circuitry is configured to determine whether a multi-branch-prediction disable field in at least one storage location holds a predetermined value, and the determination circuitry is responsive to determining that the multi-branch-prediction disable field holds the predetermined value to determine that the at least one condition is not met.

Generating a prediction for multiple branches in a single block of sequential instructions can mean that stale branch prediction data is used for the later branch instructions in the sequence—this is because the branch targets are potentially being predicted sooner than if only one branch in the sequence were predicted at a time. One might think that this would impact the accuracy of the predictions; however, the inventors of the present technique realised that modern branch prediction mechanisms are intelligent enough to adapt to such situations.

Nonetheless, this example provides a mechanism—the multi-branch-prediction disable field—which can be used to dynamically disable the multiple branch predictions of the present technique. For example, this mechanism could be used to disable multi-branch prediction when it is determined or predicted that branch predictability has degraded. For example, a single multi-branch-prediction disable field could be provided for the branch prediction circuitry, which enables or disables all multi-branch prediction. Alternatively, individual branches could be associated with corresponding multi-branch disable fields, allowing multi-branch prediction to be enabled or disabled for selected branches.

In some examples, the branch prediction circuitry comprises a branch target buffer (BTB) comprising a plurality of entries for specifying predicted branch information for a corresponding block of instructions, wherein the branch target prediction circuitry is configured to predict the predicted branch target for the selected branch instruction in dependence on the predicted branch information specified by the BTB, each entry of the BTB comprises a corresponding multi-branch-prediction disable field, and the determination circuitry is configured to determine that the at least one condition is not met in response to determining that the multi-branch-prediction disable field of a BTB entry corresponding to the selected branch instruction holds a predetermined value.

In this way, the multi-branch-disable field can be implemented in an efficient manner, simply by adding an additional field to each entry of the BTB. This allows multi-branch prediction to be enabled or disabled for individual branches—for example, the multi-branch-disable field being set in a given BTB entry could be interpreted, by the determination circuitry, as indicating that a prediction should not be generated for any subsequent branches (e.g. after the branch for which the multi-branch-disable field is set) in the sequence.

In some examples, the branch prediction circuitry comprises a branch target buffer (BTB) comprising a plurality of entries for specifying predicted branch information for a corresponding block of instructions, wherein the branch target prediction circuitry is configured to predict the predicted branch target for the selected branch instruction in dependence on the predicted branch information specified by the BTB, and BTB population circuitry responsive to an advance signal identifying the block of sequential instructions to pre-populate the BTB structure with predicted branch information for the block of sequential instructions.

In this way, it is possible to precompute many of the branch decisions for branches in the block of sequential instructions, and pre-populate the BTB on the basis of the precomputed decisions (e.g. this could involve pre-populating the BTB with branch prediction data for any branch instructions in the block that are predicted to be taken during the precomputing). This can reduce the timing path for generating the predictions, thus improving performance. This is possible because many of the branches that will be subject to examples of the present technique are direct.

In particular examples, precomputing branch decisions could be limited—for example, branch decisions may only be performed in response to level 2 BTB accesses, and/or in the shadow of late pipeline rewinds or overrides. For example, in a multi-cycle prediction pipeline, this feature could be limited to (for example) the shadow of rewinds in prediction cycles 3, 4 and beyond.

In some examples, the branch target prediction circuitry is capable of identifying the predicted target for the selected branch instruction regardless of whether the selected branch instruction comprises a forward-branch instruction representing a forward-branch with a branch target corresponding to a subsequent instruction or a backward-branch instruction representing a backwards-branch with a branch target corresponding to a previous instruction.

Branches in a program can be forward-branches, meaning that (if taken) they cause control flow to branch to a target which is further ahead in the program than the branch instruction itself, or they can be backward-branches, meaning that (if taken) they cause program flow to branch back to an earlier point in the program code. Examples of the present technique can be employed for both forward and backward branches. This can, for example, allow for performing multiple loop iterations (which typically comprise at least one backwards branch, e.g. at the end of the loop branching back to the start of the loop). In addition, supporting prediction of backward branches can be used to give the effect of "in-lining" of a function call. In-lining refers to a compiler optimization whereby a function call is replaced with the code of the function itself; however, if the compiler generates code without in-lining a function call, but the function instructions themselves are within the block of sequential instructions being processed, this example of the present technique can follow the jump to the function call and then follow the jump back to the original code, effectively allowing for dynamically in-lining a call-return pair.

In some examples, the branch prediction circuitry comprises next block identification circuitry to identify, in dependence on the prediction, a next block of sequential instructions for which a next prediction is to be generated.

The prediction generated by the branch prediction circuitry of the present technique can be used to identify a next block of sequential instructions to be the subject of a next branch prediction. This is advantageous because it allows the selection of the next block to take into account any branches in the previous block of sequential instructions that are predicted-taken.

In some examples, the next block identification circuitry is responsive to the prediction indicating predicted destinations for two or more branch instructions to identify, as the next block of sequential instructions, a block of sequential instructions starting with a predicted destination of the last of the two or more branch instructions.

Thus, in this example, it is possible to avoid generating predictions in respect of instructions that are already not expected to be executed (e.g. because a predicted-taken branch is expected to skip them). The last of the two or more branch instructions may be the last instruction in program order.

In some examples, the branch target prediction circuitry is configured to generate the branch target prediction in response to receiving an address indicating a first instruction in the identified block of sequential instructions.

Hence, the block of sequential instructions can be identified by a start address, identifying a start of the block. This address may then be looked up in various branch prediction structures in order to generate predictions.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts.

The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular embodiments will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions identified in a fetch queue 7 from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions, the branch predictor 40 being an example of branch prediction circuitry. The branch predictor is looked up based on addresses of instructions provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) (also referred to as branch target buffer (BTB) storage circuitry) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

The branch predictor 40 also comprises fetch queue population circuitry 46 to populate the fetch queue 7 in dependence on the branch predictions made by the branch predictor 40.

Figure 2:
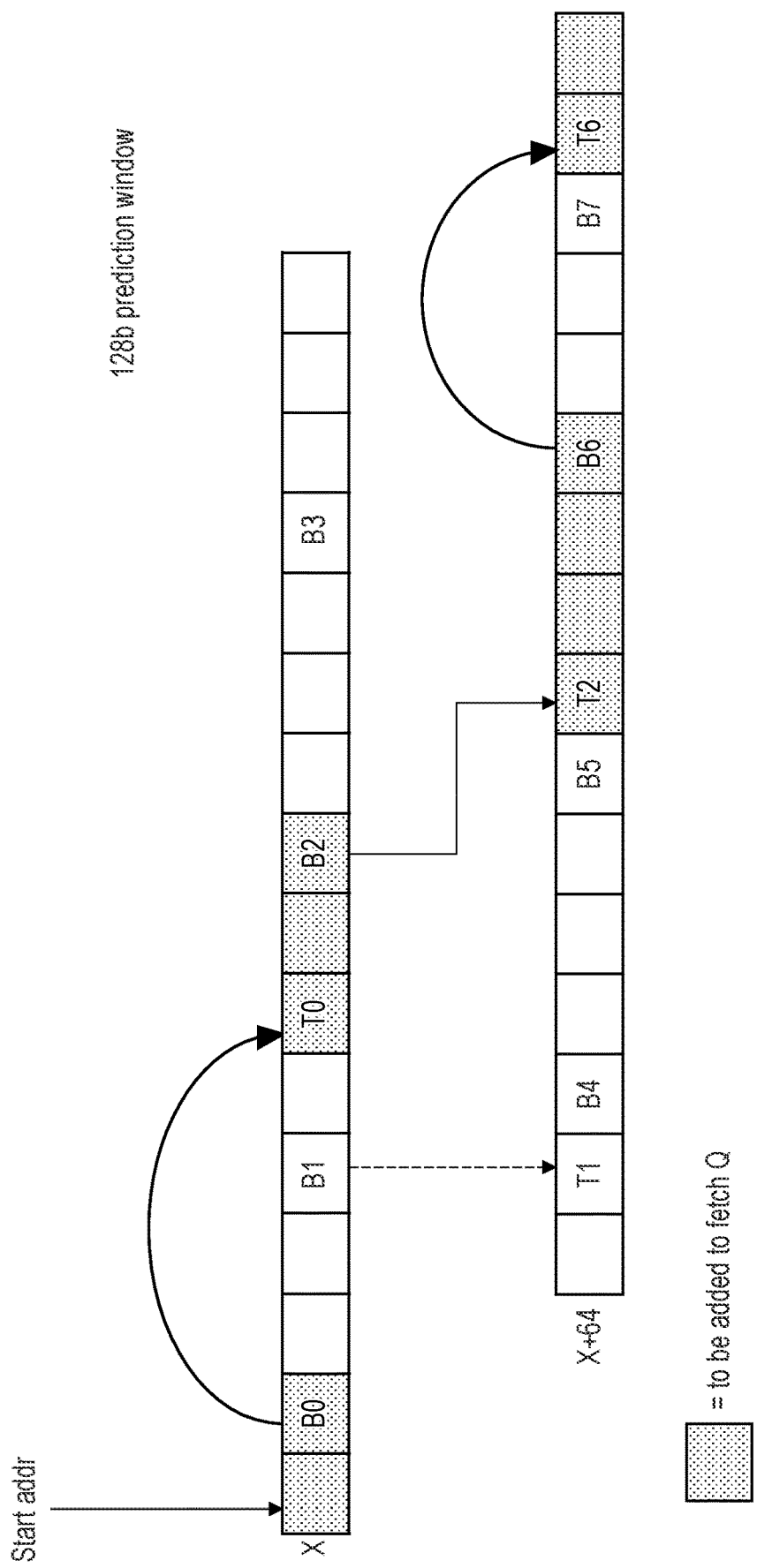
FIG. 2 illustrates an example of a block of sequential instructions for which branch prediction may be performed.

FIG. 2 illustrates an example of a block of sequential instructions for which branch prediction may be performed. For example, the block of sequential instructions may be 128 bytes of instructions, and may be identified based on a start address X identifying the first instruction in the block. This block of instructions may be referred to as a "fetch block", and may represent a next block of instructions to be fetched by the fetch circuitry.

As shown in FIG. 2, the block of sequential instructions comprises a number of branch instructions:
B0 which, if taken, branches to T0;
B1 which, if taken, branches to T1;
B2 which, if taken, branches to T2;
B3;
B4;
B5;
B6 which, if taken, branches to T6; and
B7.

The start address X may be provided to branch prediction circuitry such as the branch predictor 40 shown above, which may predict whether each of the branches B0-B7 will be taken, and what the branch target for each predicted-taken branch would be. In this particular example, it is predicted that B0, B1, B2 and B6 would, if executed, be taken. However, since the target T0 for branch instruction B0 is after B1, B1 would not actually be executed—this is indicated in the figure by a dashed line from B1 to T1. Accordingly, none of the instructions between B0 and T0, between B2 and T2 or between B6 and T6 need to be added to the fetch queue (since it is predicted that they will not be executed)

Figure 3:
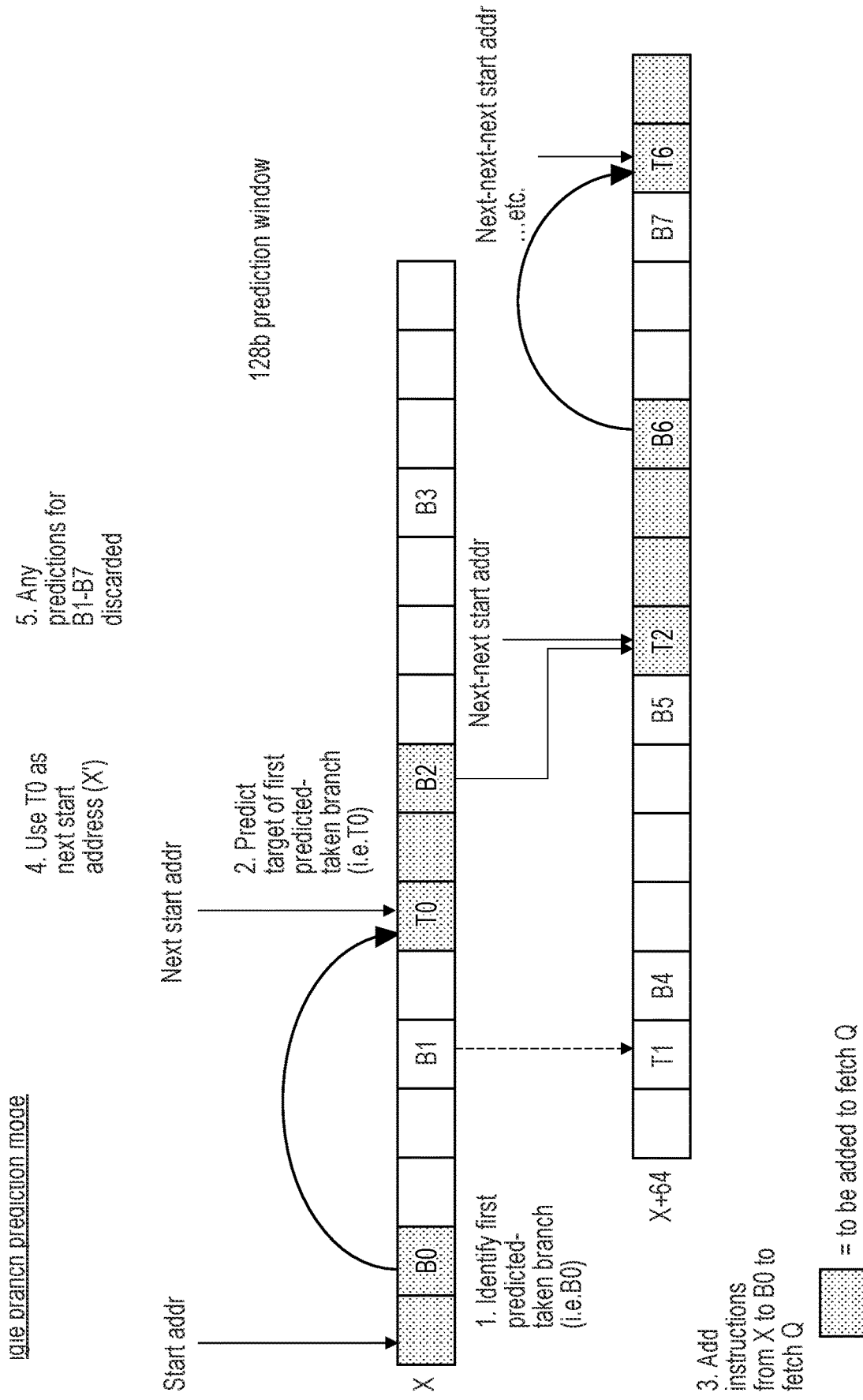
FIG. 3 illustrates an example of a single-branch prediction approach.

FIG. 3 shows an example of applying a single-prediction mode. In a single-prediction mode, the generated predictions may be used to identify the first predicted-taken branch (e.g. B0 in this case), and the predicted target for that branch (T0) would then be output and used as the start address for a next fetch block (e.g. a next block of sequential instructions on which branch prediction is to be performed).

As shown in FIG. 3, once predictions have been generated for each of the branch instructions in the block of sequential code, the first predicted-taken branch (B0) is identified and its target (T0) is predicted. The fetch queue is then populated with all of the instructions up to and including B0, and the predicted target of this branch (T0) is identified as the next start address. At this point, all of the other predictions generated by the branch predictor (e.g. the predictions for branch instructions B1-B7) are discarded, and the process repeats for the 128 byte block of sequential instructions starting at T0.

In this particular example, the process is repeated 4 times, due to there being 3 short-distance taken branches (e.g. branches which are predicted-taken and whose targets are within the same block of sequential instructions) in the block. This means that, in this example, prediction data is discarded and re-generated 3 times. Examples of the present technique aim to reduce the frequency with which useful branch predictions are discarded.

Figure 4:
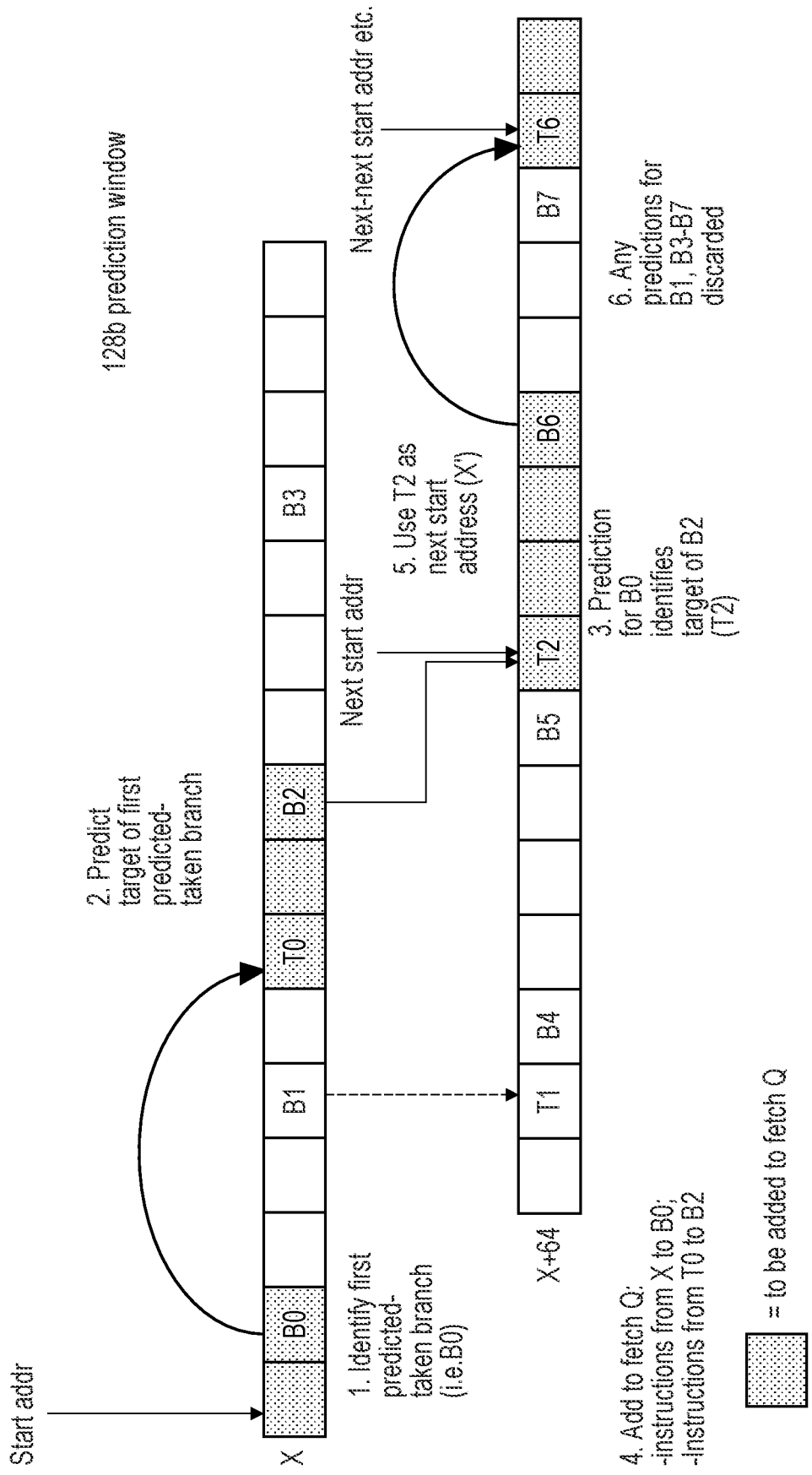
FIG. 4 illustrates an example of a single-branch prediction approach with two-taken support.

FIG. 4 illustrates another example of a single prediction mode, this time with two-taken support. In a branch predictor with support for a two-taken mode, some pairs of branch instructions may be effectively treated as a single branch instruction with a single target. For example, if a certain branch instruction is almost always taken, and is also almost always followed by a particular further branch instruction, it is possible to merge the predictions for these two branches into a single prediction. For example, if B0 is almost always taken, is almost always followed by B2, and B2 is almost always taken, their predictions may be merged (e.g. the prediction for B2 could be included in the same entry of a branch prediction data storage structure such as a BTB as the prediction for B0). This allows two branches to be predicted for a single block of sequential instructions, so that the start address for the next block of sequential instructions is T2 instead of T0. This can be an improvement over single prediction without two-taken support, but has some limitations. For example, this approach relies on the use of an appropriate encoding in branch prediction data (e.g. in a BTB), and also relies on the assumption that the first taken branch (B0) will almost always be taken. In addition, while this allows two branches to be predicted in a single block, it does not allow any more than two branches to be predicted—hence, useful prediction data can still be discarded when using the two-taken approach. Moreover, this approach is only useful in a limited number of situations—in particular, where a given branch is almost always taken, is almost always followed by another particular branch, and that particular branch is almost always taken.

Figure 5:
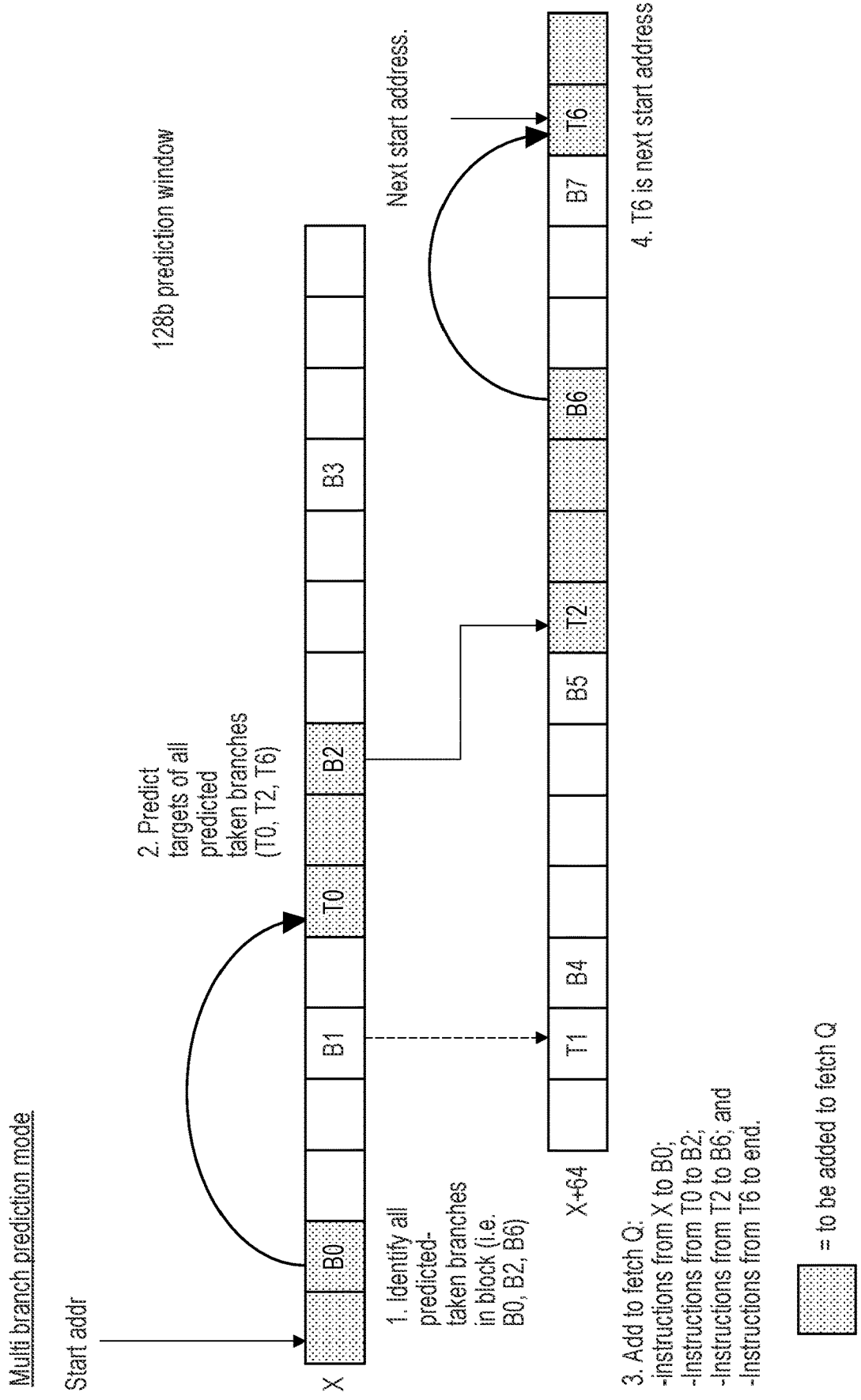
FIG. 5 illustrates an example of a multi-branch prediction approach.

FIG. 5 illustrates an example of a multi-branch prediction approach according to examples of the present technique. As noted above, if the first predicted-taken branch in a block of sequential instructions is a short-distance branch (e.g. with a branch target within the same block of sequential instructions—for example, B0, B1, B2 and B6 are all short-distance branches), useful prediction data for any subsequent branch instructions (e.g. branch instructions after the branch target of the first predicted-taken branch) may be discarded and then re-generated. This can also occur when two-taken support is provided if, for example, the second predicted-taken branch is also a short-distance branch instruction and there are one or more further branch instructions in the sequence, following the target of the second predicted-taken branch. The inventors of the present technique have observed that these scenarios are relatively common, and predict that they will become even more common as the size of the prediction window (e.g. the size of the block for which branch prediction can be performed) increases. Hence, examples of the present technique aim to reduce the amount of useful prediction data that is discarded for each fetch block subject to branch prediction.

In particular, as indicated in FIG. 5, the present technique outputs the predictions for multiple predicted-taken branches in the block—for example, the prediction for the block of instructions shown in FIG. 5 would indicate predicted targets for B0, B2 and B6, and the fetch queue would be populated accordingly.

Unlike in the single-branch prediction approach, the multi-branch prediction approach generates an output which can be used, by fetch queue population circuitry, to identify multiple discontiguous sequences of instructions from the block of sequential instructions to be identified in the fetch queue. "Discontiguous" in this sense means that at least two of the instructions to be identified in the fetch queue are separated by at least one instruction that is not to be identified in the fetch queue—for example, in FIG. 5, instructions B0 and T0 are to be identified in the fetch queue, but the intervening instructions are not. In some particular examples, the fetch queue population circuitry may be arranged to generate a single, compressed fetch queue entry to identify two or more discontiguous blocks of instructions. Hence, examples of the present technique can also help to more efficiently utilise space in the fetch queue.

Figure 6:
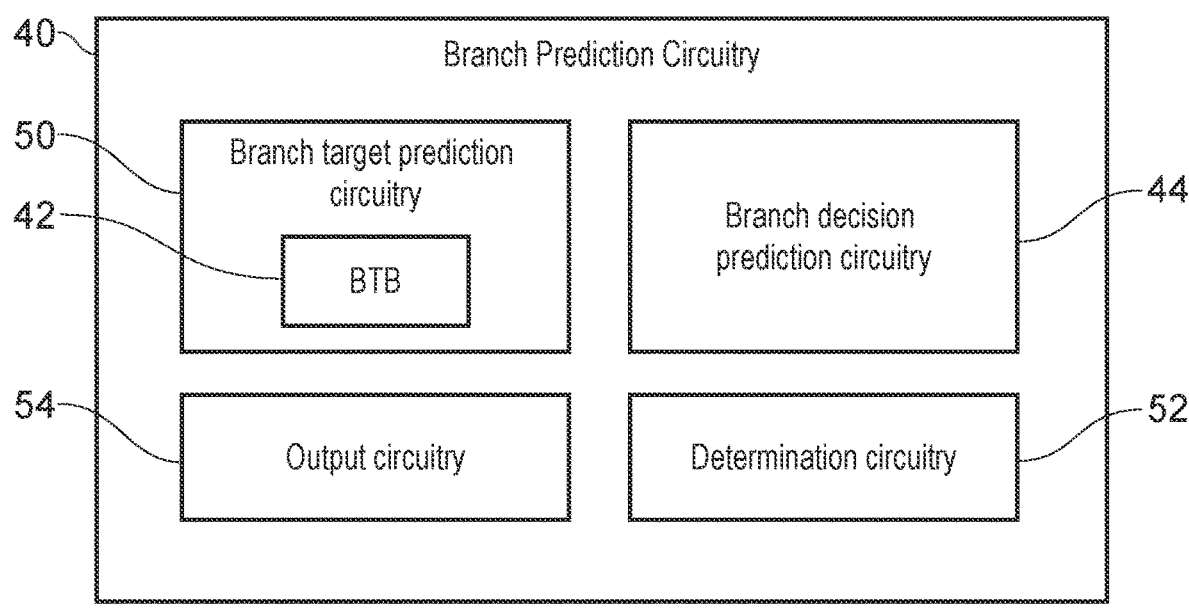
FIG. 6 shows an example of branch prediction circuitry.

FIG. 6 shows an example of branch prediction circuitry 40. The branch prediction circuitry 40 comprises branch target prediction circuitry 50 to, for an identified block of sequential instructions, generate a branch target prediction identifying a predicted branch target for a selected branch instruction in the block of sequential instructions. In this particular example the branch target prediction circuitry 50 comprises a branch target buffer (BTB) 42, and is configured to generate its predictions in dependence on branch history data (an example of branch prediction data) stored in the BTB. The branch prediction circuitry 40 also comprises output circuitry 54 to output the branch target prediction generated by the branch prediction circuitry 50, and determination circuitry 52 to determine whether at least one condition is met. The branch target prediction circuitry 50 is responsive to the determination circuitry 52 determining that the at least one condition is met to generate the branch target prediction to identify both the predicted branch target for the selected branch instruction and one or more further predicted branch targets for one or more further branch instructions in the block of sequential instructions.

In some examples, the at least one condition may be dependent on whether the predicted target of the selected branch instruction (which could, in particular examples, be the first predicted-taken branch in the block) is within the same block of instructions, and whether any further branch instructions follow the predicted branch target in the block. The at least one condition may further depend on other factors, for example whether or not a multi-branch-prediction field holds a particular value.

Figure 7:
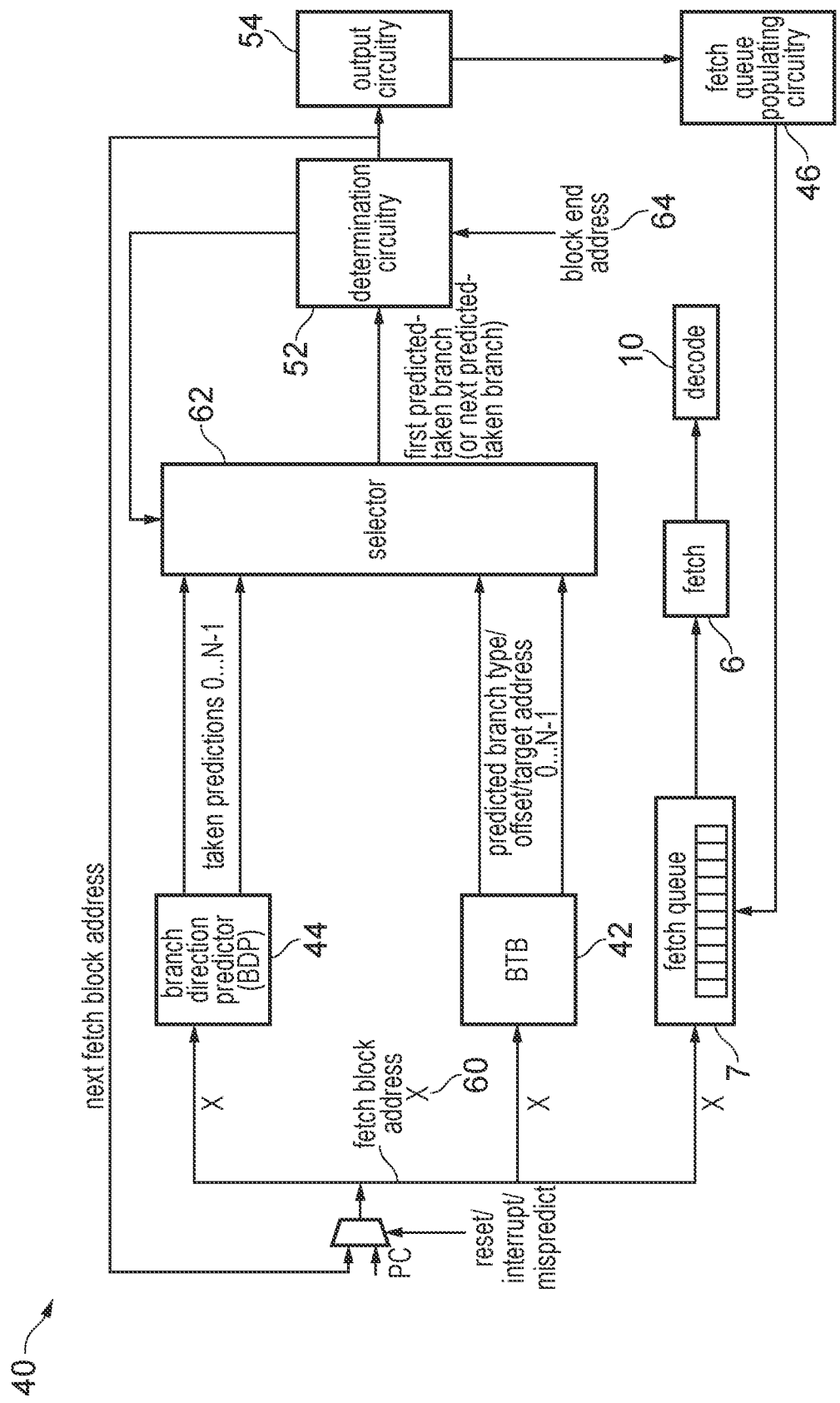
FIG. 7 shows an example of components of a branch predictor.

FIG. 7 shows an example of components of the branch predictor 40, including a branch target buffer (BTB) 42 and a branch direction predictor (BDP) 44. In each cycle of branch prediction, the fetch block address X (60) representing the address of the next instruction to be fetched by the fetch stage 6 is input to the BTB 42 and the BDP 44. The BTB 42 and BDP 44 both include a storage structure for storing various branch prediction state entries. In the case of the BDP 44, the branch prediction state entries provide a prediction of whether (if there is any conditional branch instruction within the block of instructions represented by the fetch block address X), those instructions should be taken or not taken. The BDP 44 can be implemented according to any known type of branch predictor, such as TAGE, perceptron, gskew, etc. (this list is not exhaustive).

The BTB 42 includes a number of entries which provide predictions of one or more of: whether there are any branches expected to be included in the block of instructions identified by the fetch block address X, the offsets of those branches relative to the fetch block address X, the types of the predicted branches, and for at least some branch types, a predicted target address for the branch. Here, the target address refers to the address to which program flow is to be directed if the branch is taken.

Hence, for branches other than return branch instructions, the BTB 42 may provide a prediction of the branch type, offset and target address of the predicted branches, and if any of the branches are conditional branches, then the BDP 44 provides predictions of whether those branches are taken or not taken. Based on the predictions provided by the BTB 42 and the BDP 44, a selector 62 selects a first predicted-taken branch instruction (e.g. the first branch instruction in the fetch block which is predicted to be taken). In single-prediction mode, the program instruction address for the predicted branch target of the first predicted-taken branch instruction is provided to be used as the next fetch block address X' in the next branch prediction cycle. However, the branch predictor 40 shown in FIG. 7 supports multi-branch prediction, and provides determination circuitry 52 to determine whether the predicted target of the first predicted-taken branch instruction is within the same fetch block X. For example, the determination circuitry 52 may comprise comparison circuitry to compare the instruction address of the first predicted-taken instruction with a block end address 64 representing the last instruction in the block. If the instruction address of the predicted target of the first-taken instruction is less than the block end address, this indicates that the predicted target is within the block.

If the determination circuitry 52 determines that the predicted target of the first predicted-taken branch in the block is within the block, a signal is provided to cause the selector 62 to select at least the next predicted-taken branch in the block after the predicted target of the first predicted-taken branch. The address of this instruction may also then be compared with the block end address, and so on. This allows branch target predictions for multiple branch instructions in the fetch block to be output by the output circuitry 54. Fetch queue populating circuitry 46 can then be used to populate the fetch queue 7 in dependence on the output branch target predictions. In addition, the branch target address X' of the last of the multiple branch instructions is provided as the start address of the next fetch block.

Figure 8:
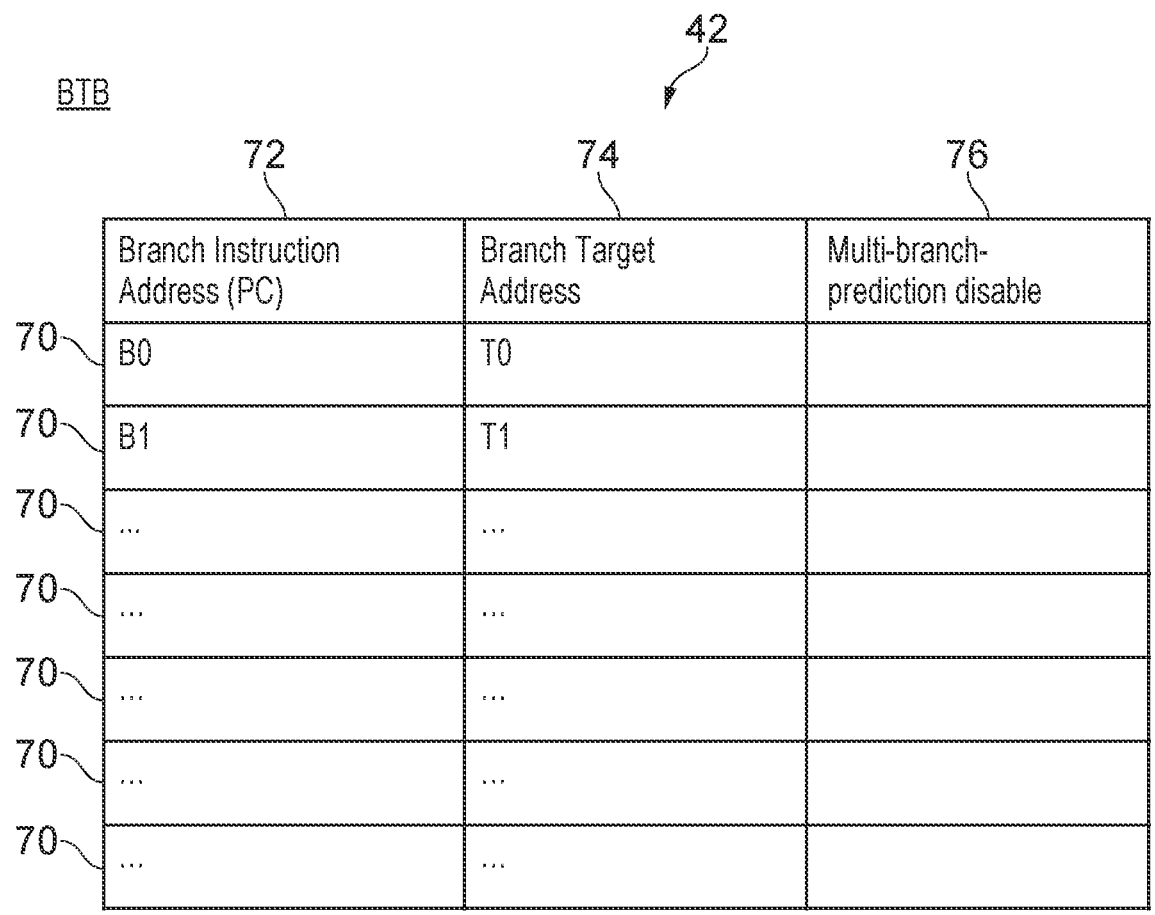
FIG. 8 shows an example of a branch target buffer (BTB)

FIG. 8 shows an example of a BTB 42. The BTB in this example comprises multiple entries 70, each comprising: a branch instruction address field 72 indicating the instruction address of a particular branch instruction; a branch target address field 74, indicating the instruction address of the predicted target of that branch instruction; and a multi-branch-prediction disable field 76. The branch target address field 74 may indicate an instruction which was the target of the corresponding branch instruction during a previous execution of that branch instruction. The multi-branch-prediction disable field 76 indicates whether multi-branch prediction is disabled for any branch instructions beyond the associated branch instruction in a given block of instructions. Note that the BTB 42 may also include additional fields, not shown in this diagram. For example, a confidence field could be provided, to track a confidence level associated with each predicted branch target, with the branch target prediction circuitry being inhibited from outputting a branch prediction unless the associated confidence value is high enough.

Figure 9:
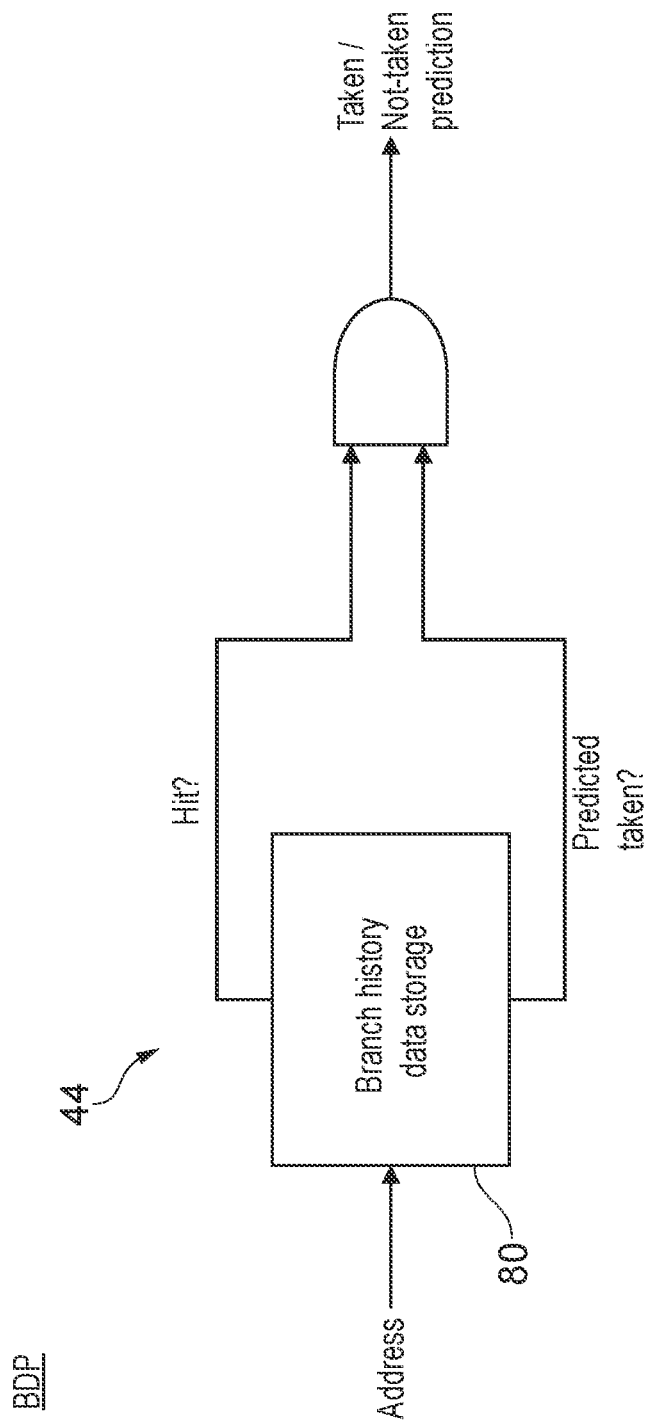
FIG. 9 shows an example of a branch decision predictor (BDP)

FIG. 9 shows an example of a BDP 44. The BDP 44 comprises branch history data storage circuitry 80 which stores branch history data indicative of whether branch instructions have been taken or not taken in the past. In the BDP 44, an instruction address is used to lookup the branch history data storage circuitry 80 and, if there is a hit, a taken or not-taken prediction is output. In examples of the present technique, the lookup address could be the start address X of a fetch block, and multiple taken/not-taken predictions may be output (e.g. to the selector described above).

Figure 10:
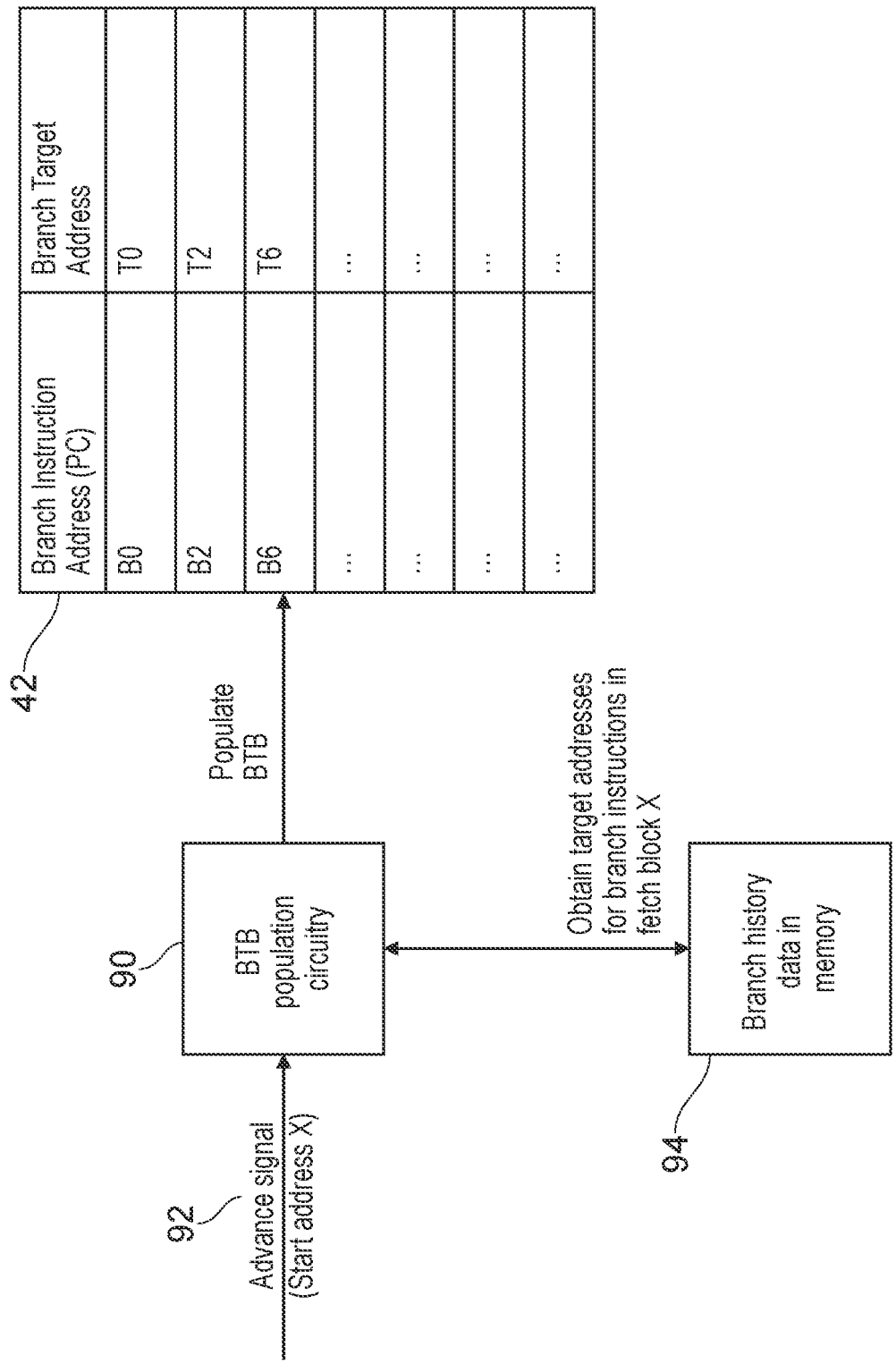
FIG. 10 illustrates an example of circuitry in a branch predictor that can be used to pre-populate the BTB.

FIG. 10 illustrates an example of circuitry in the branch predictor 40 that can be used to pre-populate the BTB 42. In this example, BTB population circuitry 90 receives an advance signal 92 identifying one or more fetch blocks for which prediction is to be performed at some later time. Based on this advance signal 92, the BTB population circuitry 90 retrieves branch history data from a storage structure 94 in memory corresponding to some or all of the branch instructions in the fetch block. The retrieved branch history data is then used to populate the BTB 42.

Figure 11:
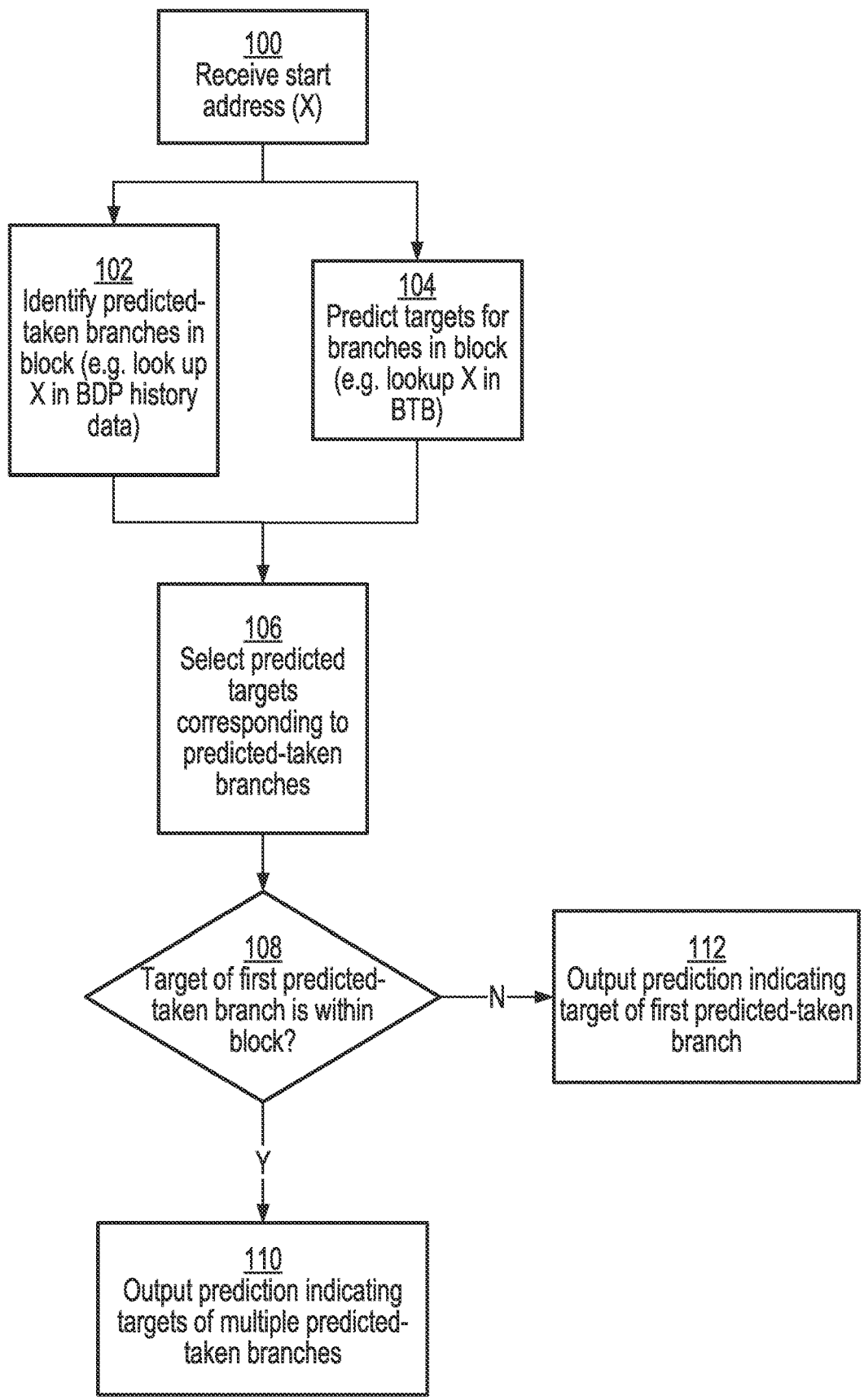
FIG. 11 is a flow diagram illustrating an example of a method for performing branch prediction.

FIG. 11 is a flow diagram illustrating an example of a method of the present technique. The method shown in FIG. 11 could, in particular examples, be implemented using the branch predictor 40. In some examples, the method of FIG. 11 could be implemented by a computer executing a computer program. Such a computer program may, in some examples, be stored on a transitory or non-transitory storage medium.

In the method shown in FIG. 11, a start address (X) is received 100, and this is looked up in the BDP to identify 102 predicted-taken branches in the block starting with the instruction at address X. The start address is also looked up in the BTB to predict 104 target addresses for branch instructions in the block. Predicted target addresses corresponding to predicted-taken branch instructions in the block are then selected 106, and it is determined 108 whether the first predicted-taken branch instruction in the block has a target address within the same block. If it is determined that the target of the first predicted-taken instruction is within the same block of instructions, a prediction indicating branch target addresses for multiple branch instructions in the block is output 110. Otherwise, a prediction indicating just the target of the first predicted-taken branch is output 112.

Concepts described herein may be embodied in a system comprising at least one packaged chip. The branch prediction circuitry described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 12:
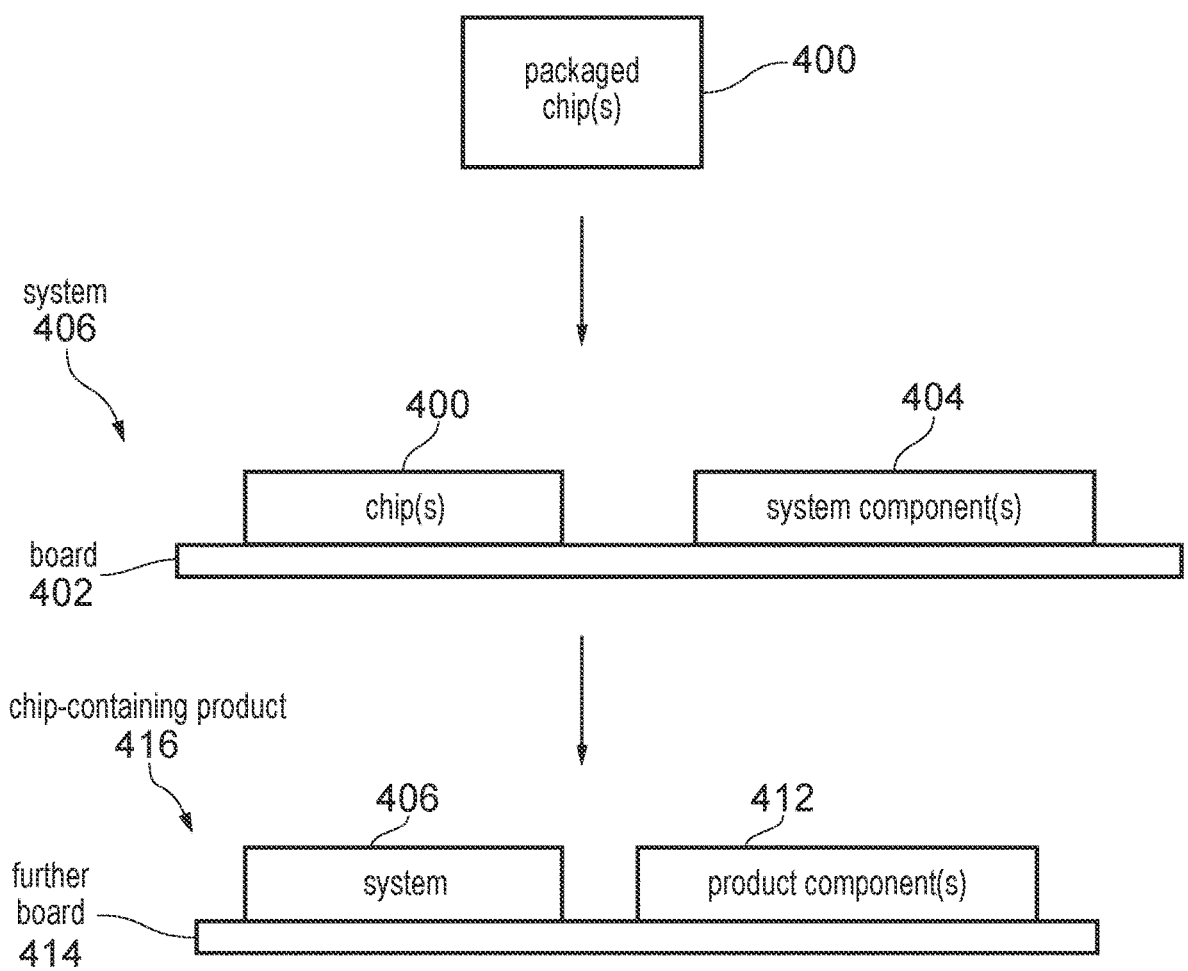
FIG. 12 illustrates a packaged chip and a chip-containing product.

As shown in FIG. 12, one or more packaged chips 400, with an apparatus comprising the branch prediction circuitry 40 described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the [apparatus/circuitry] described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Further, the words "comprising at least one of . . . " in the present application are used to mean that any one of the following options or any combination of the following options is included. For example, "at least one of: A; B and C" is intended to mean A or B or C or any combination of A, B and C (e.g. A, or B, or C, or A and B, or A and C, or B and C, or A and B and C).

Various methods are described in this application. It will be appreciated that any of these methods can, in some examples, be implemented by a computer executing instructions of a computer program. Such a computer program can be stored on a computer-readable storage medium, such as a transitory medium or a non-transitory medium.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the present technique include:

(1) Branch prediction circuitry comprising:
branch target prediction circuitry to, for an identified block of sequential instructions, generate a branch target prediction identifying a predicted branch target for a selected branch instruction in the block of sequential instructions;
output circuitry to output the branch target prediction; and
determination circuitry to determine whether at least one condition is met,
wherein the branch target prediction circuitry is responsive to the determination circuitry determining that the at least one condition is met to generate the branch target prediction to identify both the predicted branch target for the selected branch instruction and one or more further predicted branch targets for one or more further branch instructions in the block of sequential instructions.

(2) The branch prediction circuitry of clause (1), comprising:
branch decision prediction circuitry to determine whether one or more branches represented by branch instructions in the block of sequential instructions are predicted-taken; and
selection circuitry to select, as the selected branch instruction, a first predicted-taken branch instruction in the block of sequential instructions.

(3) The branch prediction circuitry of clause (1) or clause (2), wherein
the determination circuitry is configured to determine that the at least one condition is met when:
the predicted branch target for the selected branch instruction is within the block of sequential instructions; and
there is at least one further branch instruction in the block of sequential instructions after the predicted branch target for the selected branch instruction.

(4) The branch prediction circuitry of any preceding clause, wherein:
the determination circuitry comprises comparison circuitry to compare address information associated with the predicted branch target with address information associated with a last instruction in the block of sequential instructions; and
the determination circuitry is configured to determine, in dependence on the comparison, whether the predicted branch target for the selected branch instruction is within the block of sequential instructions.

(5) The branch prediction circuitry of any preceding clause, comprising fetch queue population circuitry to populate a fetch queue in dependence on the prediction, the fetch queue indicating instructions to be fetched for execution by processing circuitry.

(6) The branch prediction circuitry of clause (5), wherein
the fetch queue population circuitry is responsive to the determination that the at least one condition is met to:
generate a compressed fetch-queue entry indicating at least two discontiguous instructions from the block of sequential instructions; and
populate the fetch queue with the compressed fetch-queue entry.

(7) The branch prediction circuitry of clause (6), wherein
the fetch queue population circuitry is responsive to the determination that the at least one condition is met to generate the compressed fetch-queue entry to indicate the predicted branch target for the selected branch instruction and at least one of the one or more further predicted branch targets for the one or more further branch instructions in the block of sequential instructions.

(8) The branch prediction circuitry of any preceding clause, wherein
the branch target prediction circuitry is configured to support generation of the branch target prediction to include predicted branch targets for the selected branch instruction and two or more further branch instructions in the sequence of instructions.

(9) The branch prediction circuitry of any preceding clause, wherein:
the determination circuitry is configured to determine whether a multi-branch-prediction disable field in at least one storage location holds a predetermined value; and
the determination circuitry is responsive to determining that the multi-branch-prediction disable field holds the predetermined value to determine that the at least one condition is not met.

(10) The branch prediction circuitry of clause 9, comprising:
a branch target buffer (BTB) comprising a plurality of entries for specifying predicted branch information for a corresponding block of instructions,
wherein:
the branch target prediction circuitry is configured to predict the predicted branch target for the selected branch instruction in dependence on the predicted branch information specified by the BTB;
each entry of the BTB comprises a corresponding multi-branch-prediction disable field; and
the determination circuitry is configured to determine that the at least one condition is not met in response to determining that the multi-branch-prediction disable field of a BTB entry corresponding to the selected branch instruction holds a predetermined value.

(11) The branch prediction circuitry of any preceding clause, comprising:
a branch target buffer (BTB) comprising a plurality of entries for specifying predicted branch information for a corresponding block of instructions, wherein the branch target prediction circuitry is configured to predict the predicted branch target for the selected branch instruction in dependence on the predicted branch information specified by the BTB; and
BTB population circuitry responsive to an advance signal identifying the block of sequential instructions to pre-populate the BTB structure with predicted branch information for the block of sequential instructions.

(12) The branch prediction circuitry of any preceding clause, wherein
the branch target prediction circuitry is capable of identifying the predicted target for the selected branch instruction regardless of whether the selected branch instruction comprises a forward-branch instruction representing a forward-branch with a branch target corresponding to a subsequent instruction or a backward-branch instruction representing a backwards-branch with a branch target corresponding to a previous instruction.

(13) The branch prediction circuitry of any preceding clause, comprising
next block identification circuitry to identify, in dependence on the prediction, a next block of sequential instructions for which a next prediction is to be generated.

(14) The branch prediction circuitry of clause 13, wherein
the next block identification circuitry is responsive to the prediction indicating predicted destinations for two or more branch instructions to identify, as the next block of sequential instructions, a block of sequential instructions starting with a predicted destination of the last of the two or more branch instructions.

(15) The branch prediction circuitry of any preceding clause, wherein
the branch target prediction circuitry is configured to generate the branch target prediction in response to receiving an address indicating a first instruction in the identified block of sequential instructions.

(16) A method comprising:
generating a branch target prediction identifying a predicted branch target for a selected branch instruction in the block of sequential instructions;
determining whether at least one condition is met;
in response to determining that the at least one condition is met, generating the branch target prediction to identify both the predicted branch target for the selected branch instruction and one or more further predicted branch targets for one or more further branch instructions in the block of sequential instructions; and
outputting the branch target prediction.

(17) A system comprising:
the branch prediction circuitry of any of clauses (1) to (15), implemented in at least one packaged chip;
at least one system component; and
a board,
wherein the at least one packaged chip and the at least one system component are assembled on the board.

(18) A chip-containing product comprising the system of clause (17) assembled on a further board with at least one other product component.

(19) A computer program comprising computer-readable code for fabrication of the branch prediction circuitry of any of clauses (1) to (15).

(20) A computer-readable medium to store the computer program of clause (19).

I claim:

1. Branch prediction circuitry comprising:
branch target prediction circuitry configured to generate, for an identified block of sequential instructions, where the sequential instructions correspond to a program order in which the instructions in the block would be executed if no branches were taken, a branch target prediction identifying a predicted branch target for a selected branch instruction in the block of sequential instructions;

output circuitry configured to output the branch target prediction; and determination circuitry configured to determine whether at least one condition is met, wherein the branch target prediction circuitry is configured to generate a prediction indicating branch targets at once for two or more branch instructions in the block of sequential instructions and responsive to the determination circuitry determining that the at least one condition is met to generate the branch target prediction to identify both the predicted branch target for the selected branch instruction in the block of sequential instructions, and one or more further predicted branch targets for one or more further branch instructions in the block of sequential instructions.

2. The branch prediction circuitry of claim 1, comprising:

branch decision prediction circuitry to determine whether one or more branches represented by branch instructions in the block of sequential instructions are predicted-taken; and selection circuitry to select, as the selected branch instruction, a first predicted-taken branch instruction in the block of sequential instructions.

3. The branch prediction circuitry of claim 1, wherein the determination circuitry is configured to determine that the at least one condition is met when:

the predicted branch target for the selected branch instruction is within the block of sequential instructions; and there is at least one further branch instruction in the block of sequential instructions after the predicted branch target for the selected branch instruction.

4. The branch prediction circuitry of claim 1, wherein:

the determination circuitry comprises comparison circuitry to compare address information associated with the predicted branch target with address information associated with a last instruction in the block of sequential instructions; and the determination circuitry is configured to determine, in dependence on the comparison, whether the predicted branch target for the selected branch instruction is within the block of sequential instructions.

5. The branch prediction circuitry of claim 1, comprising fetch queue population circuitry to populate a fetch queue in dependence on the prediction, the fetch queue indicating instructions to be fetched for execution by processing circuitry.

6. The branch prediction circuitry of claim 5, wherein the fetch queue population circuitry is responsive to the determination that the at least one condition is met to:

generate a compressed fetch-queue entry indicating at least two discontiguous instructions from the block of sequential instructions; and populate the fetch queue with the compressed fetch-queue entry.

7. The branch prediction circuitry of claim 6, wherein the fetch queue population circuitry is responsive to the determination that the at least one condition is met to generate the compressed fetch-queue entry to indicate the predicted branch target for the selected branch instruction and at least one of the one or more further predicted branch targets for the one or more further branch instructions in the block of sequential instructions.

8. The branch prediction circuitry of claim 1, wherein the branch target prediction circuitry is configured to support generation of the branch target prediction to include predicted branch targets for the selected branch instruction and two or more further branch instructions in the sequence of instructions.

9. The branch prediction circuitry of claim 1, wherein:

the determination circuitry is configured to determine whether a multi-branch-prediction disable field in at least one storage location holds a predetermined value; and the determination circuitry is responsive to determining that the multi-branch-prediction disable field holds the predetermined value to determine that the at least one condition is not met.

10. The branch prediction circuitry of claim 9, comprising:

a branch target buffer (BTB) comprising a plurality of entries for specifying predicted branch information for a corresponding block of instructions, wherein:

the branch target prediction circuitry is configured to predict the predicted branch target for the selected branch instruction in dependence on the predicted branch information specified by the BTB;

each entry of the BTB comprises a corresponding multi-branch-prediction disable field; and the determination circuitry is configured to determine that the at least one condition is not met in response to determining that the multi-branch-prediction disable field of a BTB entry corresponding to the selected branch instruction holds a predetermined value.

11. The branch prediction circuitry of claim 1, comprising:

a branch target buffer (BTB) comprising a plurality of entries for specifying predicted branch information for a corresponding block of instructions, wherein the branch target prediction circuitry is configured to predict the predicted branch target for the selected branch instruction in dependence on the predicted branch information specified by the BTB; and BTB population circuitry responsive to an advance signal identifying the block of sequential instructions to prepopulate the BTB with predicted branch information for the block of sequential instructions.

12. The branch prediction circuitry of claim 1, wherein the branch target prediction circuitry is capable of identifying the predicted target for the selected branch instruction regardless of whether the selected branch instruction comprises a forward-branch instruction representing a forward-branch with a branch target corresponding to a subsequent instruction or a backward-branch instruction representing a backward-branch with a branch target corresponding to a previous instruction.

13. The branch prediction circuitry of claim 1, comprising next block identification circuitry to identify, in dependence on the prediction, a next block of sequential instructions for which a next prediction is to be generated.

14. The branch prediction circuitry of claim 13, wherein the next block identification circuitry is responsive to the prediction indicating predicted destinations for two or more branch instructions to identify, as the next block of sequential instructions, a block of sequential instructions starting with a predicted destination of the last of the two or more branch instructions.

15. The branch prediction circuitry of claim 1, wherein the branch target prediction circuitry is configured to generate the branch target prediction in response to receiving an address indicating a first instruction in the identified block of sequential instructions.

16. A method comprising:

generating, for an identified block of sequential instructions, a branch target prediction identifying a predicted branch target for a selected branch instruction in the block of sequential instructions, where the sequential instructions correspond to a program order in which the instructions in the block would be executed if no branches were taken;

determining whether at least one condition is met;

providing for generating a prediction indicating branch targets at once for two or more branch instructions in the block of sequential instructions; and in response to determining that the at least one condition is met, generating the branch target prediction to identify both the predicted branch target for the selected branch instruction in the block of sequential instructions, and one or more further predicted branch targets for one or more further branch instructions in the block of sequential instructions; and outputting the branch target prediction.

17. A system comprising:

the branch prediction circuitry of claim 1, implemented in at least one packaged chip;

at least one system component; and a board, wherein the at least one packaged chip and the at least one system component are assembled on the board.

18. A chip-containing product comprising the system of claim 17 assembled on a further board with at least one other product component.

19. A non-transitory computer-readable medium to store computer-readable code for fabrication of the branch prediction circuitry of claim 1.

* * * * *